Feb. 28, 1933.  W. B. FOSTER  1,899,087
SPRING STRUCTURE
Filed Dec. 12, 1929  2 Sheets-Sheet 1

WILLIAM B. FOSTER Inventor

By Martin & Rendell
Attorneys

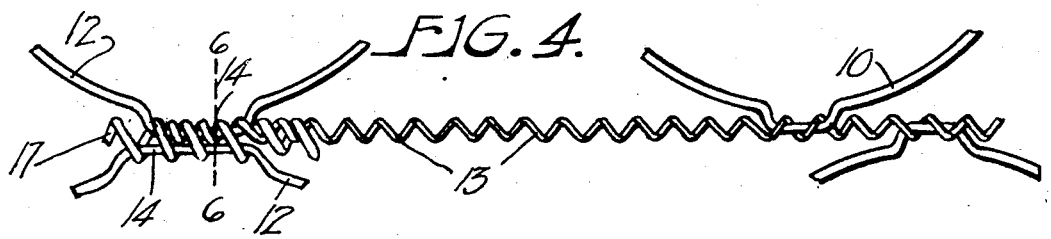
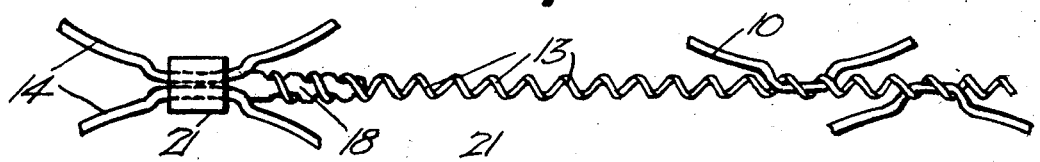
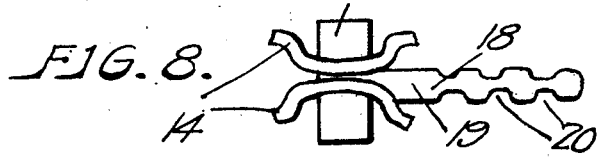
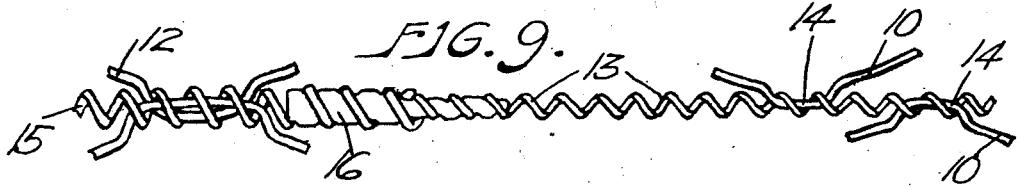
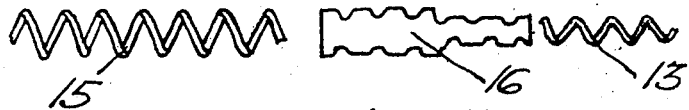
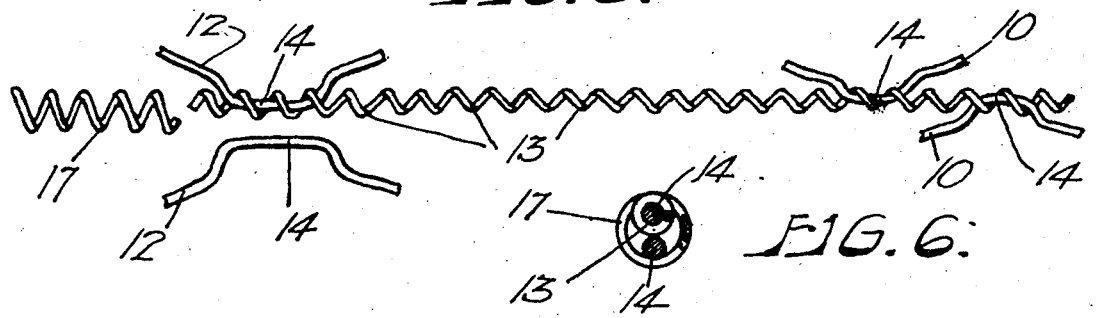

Patented Feb. 28, 1933

1,899,087

UNITED STATES PATENT OFFICE

WILLIAM B. FOSTER, OF UTICA, NEW YORK, ASSIGNOR TO FOSTER BROTHERS MANUFACTURING COMPANY, OF UTICA, NEW YORK

SPRING STRUCTURE

Application filed December 12, 1929. Serial No. 413,667.

My present invention relates to spring structures or spring assemblies including thereby such structures as may be used in bed springs, spring cushions and spring-filled mattresses. The purpose of this invention is to provide a new and improved form of such construction and particularly to provide a construction which is readily and economically formed, effective and durable in operation and well adapted to provide a spring structure that is sufficiently yielding to be comfortable but not liable to get out of position when subjected to strain.

Further purposes and advantages of the invention will appear from the specification and claims herein.

Fig. 4 is a view similar to Fig. 2 illustrating another embodiment of this invention and Fig. 5 is a detailed view of the parts of the end joint used before the parts are completely assembled.

Fig. 6 is an enlarged sectional view on line 6—6 of Fig. 4.

Fig. 7 is a plan view of a part of a structure illustrating a still further modification of my invention.

Fig. 8 is a detail view of the parts used in the end joint of Fig. 7 but before said parts are completely assembled.

Fig. 9 is a plan view of a part of a spring structure showing another modified form of the invention and Fig. 10 is a detail view of the parts used in an end joint thereof before the parts are fully assembled.

Figure 1:
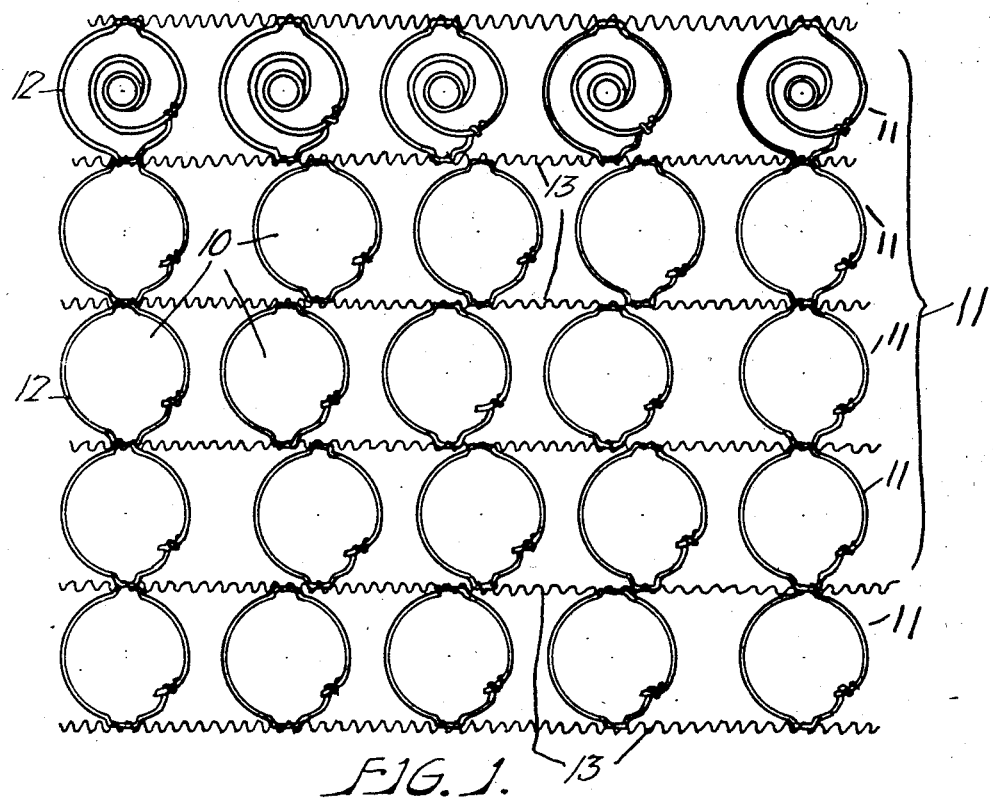
Fig. 1 is a plan view of a portion of a spring structure embodying this invention.

Referring to the drawings in a more detailed description it will be seen that the spring structure or spring assembly illustrated in Fig. 1 is composed of a considerable number of coiled springs 10 arranged in a plurality of rows as 11 extending for either the length or breadth of the structure and with the end coils 12 of said springs connected more or less directly to spiral wires 13 extending longitudinally between adjoining rows of springs so as to effect an assembly of the structure and still allow a large degree of bending or hinging action between each spring and the neighboring springs and between each spring and its adjacent portion of the spiral wire.

Preferably the end coils 12 of the said main springs 10 are provided with outwardly extending bow-shaped parts or offsets 14 facing towards the adjoining row of springs. Such bow-shaped portions or offsets 14 are provided in order that the spiral wire 13 having a relatively small diameter may be readily threaded upon such projecting bow-shaped portions or offsets. Over the larger part of the structure the spiral wire 13 will preferably have an internal diameter only a little larger than the diameter of the wire used in forming the main coil springs 10. In a structure composed as contemplated in this invention the end springs of adjoining rows and usually of all of the rows in the structure will be in alignment, that is will come out to the line of the end or side edge of the structure, but the intermediate springs in adjoining rows of the structure will be staggered in arrangement as plainly indicated in Fig. 1 so that the offsets 14 of the said intermediate springs of two adjoining rows will be spaced from each other although they will have their outer portion in alignment. These aligned but spaced offsets 14 of the intermediate springs will have threaded thereupon a length of spiral wire with said spiral engaging first an end coil from one row and then an end coil from the adjoining row and then an end coil from the first row and then another end coil from the second or adjoining row and so on across the structure. In this way a convenient but serviceable connection is made between the intermediate springs and the desired extent of pivotal action is obtained between each end coil of an intermediate spring and the spiral wire and accordingly between neighboring intermediate springs through a common spiral wire. As already mentioned the part of said spiral wire opposite the said intermediate springs is of relatively small diameter, that is its internal diameter is such as to relatively closely fit the wire of said main springs when the spiral wire is screwed upon said offsets of the intermediate springs. As these intermediate springs have their offsets spaced from each other by arrangement of the springs and affirmatively spaced from each other when assembled by the use of said spiral wire, said intermediate springs are kept out of contact with each other directly and so noise or distortion that would arise from such contact is avoided. As the spiral wire has to encircle only one diameter of the wire forming the main springs at a time a relatively small diametered spiral can be used so that the spiral will not project above the top or other used surface of the spring structure.

The end springs of adjoining rows, however, cannot be in practice arranged in staggered formation, but must be in alignment with that end or side of the spring structure in order to maintain the usual rectangular shape of such a spring structure or at least a straight side or end edge along one or more edges of the structure. Ordinarily also the offsets 14 of these end springs will be as shown in the drawings immediately opposite in the end springs of adjoining rows and should be connected by a common means so as to help maintain said end springs in proper relative alignment along the edge of the structure. As already mentioned, the regular spiral wire 13 has its coil of an internal diameter only sufficient to encircle one wire of a main spring and so cannot encircle the two closely arranged wires of the offsets of these end springs. Accordingly at the ends of the said spiral wires 13 or at the joints to be effected between the offsets of the end springs I provide another form of joint but preferably make the means so provided to effect said joint connected or operatively connected to the end of the length of spiral wire. Such connection or operative connection between these end fastening members and the regular long length of spiral wire 13 is advantageous in all cases in order to distribute the strain of use and help in keeping the parts in position and in some cases such connection is absolutely necessary as said spiral wires may be the only means for connecting the springs in the rows.

Figure 3:
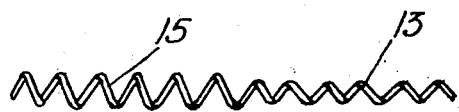
Fig. 3 is a plan view of an end portion of the spiral wire used.
Figure 2:
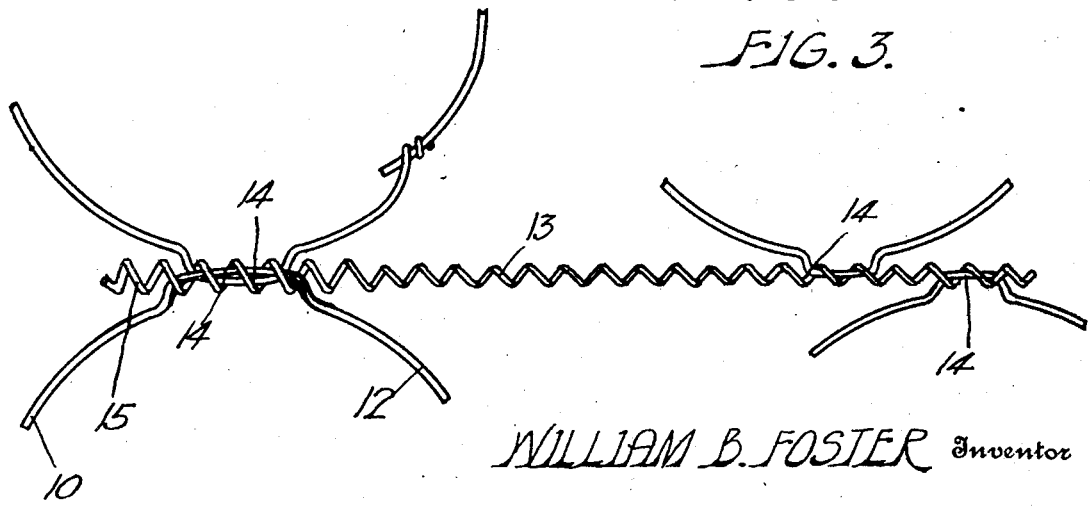
Fig. 2 is a plan view on an enlarged scale of part of the structure shown in Fig. 1

The means provided for effecting a joint between such end springs and the spiral wire as shown in Fig. 2 consists in providing at the opposite ends of the spiral wire 13 and at the points opposite the offsets 14 of the end springs a section 15 of spiral wire having the internal diameter of its coil large enough to enclose or encircle the two adjacent wires of the two offsets 14 that are to be connected. As shown in Figs. 2 and 3, this section 15 of spiral wire having an enlarged internal diameter is integral with the main length of spiral wire 13. It will be understood of course that the pitch of these enlarged sections 15 should be the same or approximately the same as the pitch of the rest of the spiral wire 13 in order to enable such spiral wire to be threaded onto the springs in two adjoining rows without displacing the springs or distorting the spiral wire.

Fig. 3 is a plan view of such an enlarged diameter section 15 of spiral wire made integral or integrally connected to the end of the regular small diameter spiral wire 13.

Fig. 9 is a plan view of another form of means used for the joint between the offsets of the end springs wherein the large diameter section 15 of spiral wire is in the form of a separate piece or short section of such large diametered spiral wire connected to or attached to the adjacent end of said small diametered spiral wire 13. The connection between the two different diametered coils of said spiral wires is effected by wire or sheet metal connecting member 16 (see Fig. 10) to the opposite ends of which are secured said two spiral wires.

In the embodiment of my invention shown in Figs. 4–6 the joint between the opposite offsets 14 of an adjacent pair of end springs is made by having the end of the regular small diametered spiral wire 13 threaded upon the offset 14 of one of said springs. Then a separate short section of spiral wire 17 having the internal diameter of its coil of sufficient size is threaded onto both offsets of the two springs connected at this joint.

Fig. 5 is a detailed view of this joint immediately before the section 17 of the large spiral is threaded onto the other parts but showing the said spiral section 17 adjacent the joint and ready to be screwed into position.

Fig. 6 is a sectional view on an enlarged scale on line 6—6 of Fig. 4.

After the large diametered spiral section 17 is so threaded into place one or both ends thereof will be bent against an adjacent part of one of the springs in order to keep the parts assembled. In this construction it will be seen that the large diametered spiral wire 17 encircles the wire of both of the offsets 14 of said pair of springs and also encircles a large part of the portion of the small diametered spiral wire 13 included in the joint. While the small spiral wire is attached directly only to one of the end springs it will be seen that when the joint is completed the other end spring will also be tied to said small spiral wire. It will be understood that in effecting this joint the shape, size and pitch of the large diametered spiral wire 17 will preferably be such as to have the wire of said large spiral 17 fit between the wire of the small spiral wire 13 especially on the inside of the offset 14 encircled by the small spiral wire.

Figs. 7 and 8 show a modified form of end joint that may be used to embody my invention. In this form of end joint a clip 18 is used which clip conveniently will be formed of sheet metal as shown in Fig. 8 and has roughly the shape of the letter T. The shank 19 of this piece is provided on its opposite sides with indentations 20 so that the end of the small diametered spiral wire 13 may be screwed upon said shank 19. The head 21 of the clip 18 then has its opposite ends bent to enclose the two offsets 14 of the springs at the joint. Preferably the head of this clip has its ends bent toward each other so as to encircle the two offsets 14 loosely enough to allow both end springs to swing or pivot relative to the clip 18.

I claim:

1. In a spring assembly, a plurality of rows of closely arranged coiled springs, the end springs of adjoining rows having their end coils oppositely and closely arranged and the intermediate springs of adjoining rows being staggered and having parts of their end coils in alignment but spaced from one another, a spiral wire extending longitudinally between the springs of each pair of adjoining rows for the full length of the rows, said spiral wire having the internal diameter of its coil of a size to closely fit one wire of the coil springs and being closely threaded upon the separate aligned parts of said intermediate springs and upon one spring of each end pair of springs and, at the opposite ends of said small diametered spiral wire, a length of spiral wire having the internal diameter of its coil large enough to simultaneously encircle two adjacent wires of the coiled springs and simultaneously encircling the approaching portions of the end coils of two end springs and also threaded upon the ends of the smaller spiral wire.

2. In a spring assembly, a plurality of rows of closely arranged coiled springs, the end springs of adjoining rows having their end coils oppositely and closely arranged and the intermediate springs of adjoining rows being staggered and having parts of their end coils in alignment but spaced from one another, a spiral wire extending longitudinally between the springs of each pair of adjoining rows, the portion of said spiral wire opposite the intermediate springs having the internal diameter of its coil of a size to closely fit one wire of the intermediate coil springs and being closely threaded upon the separate aligned parts of said intermediate springs and, operatively connected to the opposite ends of said small diametered spiral wire, a length of spiral wire having the internal diameter of its coil large enough to simultaneously encircle two adjacent wires of the coiled springs and simultaneously encircling the approaching portions of the end coils of two end springs.

3. In a spring assembly, a plurality of rows of closely arranged coiled springs, the end springs of adjoining rows having their end coils oppositely and closely arranged and the intermediate springs of adjoining rows being staggered and having parts of their end coils in alignment but spaced from one another. a spiral wire extending longitudinally between the springs of each pair of adjoining rows, the portion of said spiral wire opposite the intermediate springs having the internal diameter of its coil of a size to closely fit one wire of the intermediate coil springs and being closely threaded upon the separate aligned parts of said intermediate springs and, at the opposite ends of said small diametered portion of said spiral wire and integral therewith a length of spiral wire having the internal diameter of its coil large enough to simultaneously encircle two adjacent wires of the coiled springs and simultaneously encircling the approaching portions of the end coils of two end springs.

4. In a spring assembly, a plurality of rows of closely arranged coiled springs, the end springs of adjoining rows having their end coils oppositely and closely arranged and the intermediate springs of adjoining rows being staggered and having parts of their end coils in alignment but spaced from one another, a spiral wire extending longitudinally between the springs of each pair of adjoining rows, the portion of said spiral wire opposite the intermediate springs having the internal diameter of its coil of a size to closely fit one wire of the intermediate coil springs and being closely threaded upon the separate aligned parts of said intermediate springs and, at the opposite ends of said small diametered portion of said spiral wire and integral therewith a length of spiral wire having the internal diameter of its coil large enough to simultaneously encircle two adjacent wires of the coiled springs and simultaneously encircling the approaching portions of the end coils of two end springs, the pitch of the larger diametered coils of the spiral wire being substantially equal to the pitch of the smaller diametered coils, whereby one of said spiral wires may be threaded upon all the springs of two adjoining rows without displacement or distortion.

In witness whereof I have affixed my signature, this 22nd day of October, 1929.

WILLIAM B. FOSTER.